US009440360B2

(12) United States Patent
Heinrich et al.

(10) Patent No.: US 9,440,360 B2
(45) Date of Patent: Sep. 13, 2016

(54) CHANGE-OVER COUPLING

(75) Inventors: Harald Heinrich, Au (DE); Matthias Binswanger, Thierhaupten (DE)

(73) Assignee: KUKA SYSTEMS GMBH, Augsburg (DE)

( * ) Notice: Subject to any disclaimer, the term of this patent is extended or adjusted under 35 U.S.C. 154(b) by 505 days.

(21) Appl. No.: 13/980,773

(22) PCT Filed: Jan. 18, 2012

(86) PCT No.: PCT/EP2012/050694
§ 371 (c)(1),
(2), (4) Date: Jul. 19, 2013

(87) PCT Pub. No.: WO2012/098152
PCT Pub. Date: Jul. 26, 2012

(65) Prior Publication Data
US 2013/0294829 A1    Nov. 7, 2013

(30) Foreign Application Priority Data

Jan. 21, 2011 (DE) .................... 20 2011 000 150 U

(51) Int. Cl.
*B25J 15/04* (2006.01)
*B23Q 1/00* (2006.01)
*B25J 19/00* (2006.01)

(52) U.S. Cl.
CPC .......... *B25J 15/0408* (2013.01); *B23Q 1/0018* (2013.01); *B25J 15/04* (2013.01); *B25J 19/0029* (2013.01); *Y10S 901/30* (2013.01); *Y10T 403/7075* (2015.01)

(58) Field of Classification Search
CPC .. B25J 15/04; B25J 19/0029; B25J 19/0033; B23Q 1/00; B23Q 1/18; B23Q 3/155; B23B 1/1071; B23B 1/22
See application file for complete search history.

(56) References Cited

U.S. PATENT DOCUMENTS

| 4,636,135 A | 1/1987 | Bancon |
| 5,145,227 A | 9/1992 | Monford, Jr. |
| 2010/0067981 A1* | 3/2010 | Geyer ............... B25J 15/04 403/315 |
| 2010/0184575 A1 | 7/2010 | Williams et al. |
| 2010/0197472 A1 | 8/2010 | Strotzer et al. |

FOREIGN PATENT DOCUMENTS

| DE | 38 12 527 A1 | 10/1989 |
| DE | 43 21 691 A1 | 1/1994 |

(Continued)

OTHER PUBLICATIONS

Machine Translation of DE102006040034, run Jan. 6, 2016, source: http://translationportal.epo.org.*

(Continued)

*Primary Examiner* — Daniel Wiley
(74) *Attorney, Agent, or Firm* — McGlew and Tuttle, P.C.

(57) ABSTRACT

A change-over coupling (1) for robot-guided vehicles (3) has a plurality of media couplings (11, 12) and has coupling parts (4, 5) having basic supports (6, 7), media coupling supports (13, 14) and a coupling mechanism (8), and also peripherally arranged interfaces (16) having a fitting element for the media couplings (11, 12). The interfaces (16) have a plurality of fitting elements (19, 19', 20, 20'), which act in a plurality of different directions or axes and which are arranged preferably at a periphery, in particular on a circumference of a disc-like or annular basic support (6, 7).

21 Claims, 7 Drawing Sheets

(56) References Cited

FOREIGN PATENT DOCUMENTS

| DE | 202 08 060 U1 | 9/2003 |
| DE | 103 94 188 T5 | 2/2006 |
| DE | 10 2007 016 300 A1 | 10/2007 |
| DE | 10 2006 040 034 A1 | 3/2008 |
| DE | 10 2008 002 642 A1 | 2/2010 |
| DE | 10 2010 004 085 A1 | 7/2011 |
| EP | 02 82 417 A1 | 9/1988 |
| EP | 13 64 756 A1 | 11/2003 |

OTHER PUBLICATIONS

Machine Translation of EP1364756, run Jan. 6, 2016, source: http://translationportal.epo.org.*

* cited by examiner

CHANGE-OVER COUPLING

CROSS REFERENCE TO RELATED APPLICATIONS

This application is a United States National Phase Application of International Application PCT/EP2012/050694 filed Jan. 18, 2012 and claims the benefit of priority under 35 U.S.C. §119 of German Utility Model Application DE 20 2011 000 150.4 filed Jan. 21, 2011, the entire contents of which are incorporated herein by reference.

FIELD OF THE INVENTION

The present invention pertains to a change-over coupling for robot-guided tools with one or more media couplings, wherein the change-over coupling has coupling parts with basic supports, media coupling supports and a coupling mechanism, as well as a plurality of interfaces at a periphery with a fitting element for media couplings.

BACKGROUND OF THE INVENTION

Such an automatic change-over coupling is known from DE 43 21 691 A1. It is intended for a robot for automatically picking up and changing tools and has two coupling parts with basic supports and with a coupling mechanism for the controlled connection and release of the coupling parts. The change-over coupling also has at least one media coupling, with which media-carrying lines can be coupled.

SUMMARY OF THE INVENTION

An object of the present invention is to improve the prior-art change-over coupling.

According to the invention, a change-over coupling is provided for robot-guided tools. The change-over coupling includes one or more media couplings (11, 12). The change-over coupling comprises coupling parts with basic supports, media coupling supports and a coupling mechanism, as well as a plurality of interfaces at the periphery with a fitting element for media couplings. The interfaces have a plurality of fitting elements, which act in a plurality of different directions or axes.

The improvement is possible in several respects. Any media couplings can be attached to the multiple interfaces of the change-over coupling and the basic supports thereof and can be changed as needed. A modular design of the media couplings with standard media coupling supports and with adapted coupling elements is possible here. The interfaces can be occupied as desired, and a coupling supply may also be attached at different sites besides media couplings. This media supply can, for example, supply the coupling mechanism with power and control the function thereof for opening and closing.

The standard interfaces, which can be occupied freely, have the advantage that the media couplings or other attached parts can be arranged and adapted to the corresponding ambient conditions as needed. For example, feed lines can be laid and disentangled optimally. In particular, a feed line may be led obliquely or tangentially to the change-over coupling. However, axially parallel feeding s also possible, e.g., for media in the form of a current or of individual functional bodies.

Attachment of the media couplings at the periphery on the circumference of the basic supports, which may have a round or polygonal prismatic shape for this, is favorable. Five, six, seven, eight or more interfaces and attachment possibilities are preferably present. As an alternative, the number of interfaces may also be lower.

A further and independent improvement lies in the design of an attachment interface with fitting elements and fixing means. As a result, the media coupling supports can be mounted on the respective basic supports in an accurate fit. After the basic supports have been manufactured with the corresponding accuracy, the media coupling supports and the media coupling elements arranged thereon likewise have an exact position, so that they can be brought together and again separately exactly during coupling and uncoupling. The change-over coupling according to the invention thus has a very high coupling precision despite high flexibility of attachment.

The change-over coupling can be used universally and can have any desired media couplings. This also has a favorable effect on the expansion of the spectrum of media that can be coupled. Such media and their feed lines may be operating materials, such as compressed air, coolant, lubricant or the like. Furthermore, electric currents, especially power currents and/or signal currents, e.g., for control signals, sensor signals or the like, can be transmitted. The change-over coupling also makes it possible to expand the spectrum to completely different operating materials, which may be, e.g., functional bodies for the operation of the attached tool. The latter may be, e.g., screws for a screw-driving tool, studs for a stud welding tool, spheres or other granulated bodies for a sandblasting or shot-peening tool, liquid or pasty media for an applicator tool, e.g., a glue gun, a paint spray gun or the like.

The change-over coupling according to the invention makes it possible to attach the media couplings in a narrow ring around the connection sites, which are provided for connecting the coupling parts to the driven element of the robot, e.g., a robot hand and possibly the driven flange thereof, on the one hand, and with the tool, on the other hand. This modularity and variability in the selection and attachment possibilities of the media couplings may affect, furthermore, the line routing at the robot and possibly at the tool. Feed lines for the said media may be laid along one or more robot arms, which preferably happens on the outside thereof. The change-over coupling itself has only a very small interference range. The fact that line routing is made possible in a narrow and compact manner in the area of the robot and/or tool also leads to a reduction of the interference range there. This is advantageous for the possibilities of using the robot and tool and increases the mobility thereof.

Further independent possibilities of improvement with the accomplishment of the object is the optimization of the coupling supply by redundant and especially diversitary redundant design. This increases the operational reliability and failure safety of the change-over coupling.

The maintenance display, which signals the maintenance-specific situation of the change-over coupling at the change-over coupling itself, is also used for a similar improvement. This may be information on the operating time and possibly the operating state of the change-over coupling, and a human operator can make a decision about the time and scope of a maintenance or possibly even a repair on the basis of this information. As an alternative or in addition, the maintenance display may also emit itself a maintenance prompt, a warning signal or the like.

Another of the said improvements pertains to a detection means for the mutual positions of the coupling parts. This detection means can detect an automatic accurate alignment of the coupling parts, performed by the robot, in the released state and during the approach of said coupling parts and report it in an appropriate manner, and especially signal it to the robot control. This position determination can be used, on the one hand, at the time of the first-time set-up of the tool and at the time of teaching a tool its deposition position in a magazine. However, the position detection may also be performed in each coupling operation in order to ensure the coupling precision under any circumstances and at any time. Possible external effects and a change in the position of the coupling parts which is associated herewith in the intended coupled position can be detected and compensated.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
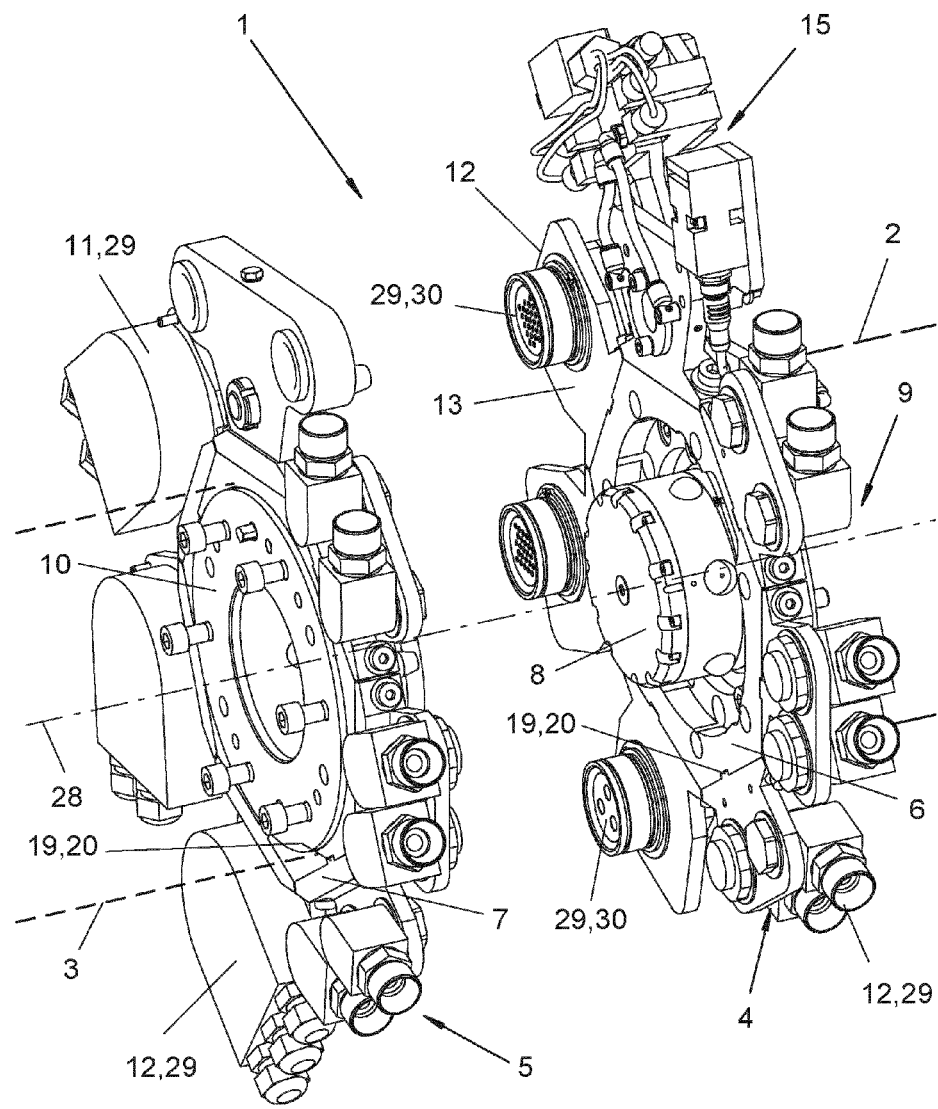
FIG. 1 is a perspective view of two coupling parts of an automatic change-over coupling in the released position with indicated robot and tool contours.

Referring to the drawings in particular, the present invention pertains to a change-over coupling (1) for robot-guided tools (3). The present invention also pertains to a robot (2) equipped with such a change-over coupling (1).

The change-over coupling (1) has two coupling parts (4, 5), which are shown in FIG. 1 in a distanced coupling readiness position, and they are aligned with a common central axis (28), especially a rotating driven axle of the robot (2). The parallel coupling parts (4, 5) can be moved towards one another from this readiness position in the axial direction and coupled. The robot (2) and the tool (3) are represented schematically and indicated by broken lines in FIG. 1.

The change-over coupling (1) is preferably a remote-controllable or automatic change-over coupling and has a coupling mechanism (8) for the controlled connection and release of the coupling parts (4, 5). The coupling mechanism (6) may have any desired and suitable design. In the embodiment shown at the robot-side coupling part (4), it may have, e.g., a projecting cylindrical body with drivable locking elements in the jacket of the body, with the body dipping into a corresponding annular mount at the tool-side coupling part (5) during coupling, as this is shown, e.g., in FIGS. 3 and 5.

This mounting ring may have openings or other suitable mounts for the locking elements to form a positive-locking connection between the parts of the coupling mechanism (8). The locking elements, which are designed, e.g., as balls, bolts or the like, may be actuated in any desired manner, e.g., by a fluid, especially compressed air.

A coupling supply (15), which may be attached to the change-over coupling (1) in the manner described below, may be provided for actuating the coupling mechanism (8). The coupling parts (4, 5) may have, furthermore, guide elements, e.g., conical pins and centering holes, which mesh with one another during coupling.

The coupling parts (4, 5) may have a basic support (6, 7) each, which has, e.g., a plate-like or, as in the exemplary embodiments being shown, disk-like design. The disk ring-shaped basic support (6, 7) surrounds the centrally arranged coupling mechanism (8). The coupling parts (4, 5) have a connection (9, 10) each for connection to the robot (2) or to the tool (3). The connections (9, 10) may be arranged at the basic supports (6, 7) and may be designed, e.g., as threaded flanges.

Change-over coupling (1) has one or more media couplings (11, 12) for identical or different media. The coupling parts (4, 5) and especially the basic supports (6,7) thereof have a plurality of interfaces (16) for connecting these media couplings (11, 12). The number of interfaces (16) and of the media couplings (11, 12) that can be attached here is selectable. Six or seven interfaces (16) are present in the exemplary embodiment being shown. As an alternative, the number of interfaces may be lower or higher. Five, six, seven or eight interfaces (16) are preferably present. Fewer, e.g., three or four or even more, e.g., nine or ten interfaces (16) may also be present as an alternative.

The media couplings (11, 12) may have, as was mentioned, the same design or different designs. This depends, among other things, on the design of the tools (3). Tool (3) may have any desired design. It may be, e.g., a joining tool, especially a welding, gluing or forming tool. Tool (3) may also be used to apply fluidic media, e.g., liquids, pasty compounds, powdered compounds or the like. A further possibility of variation lies in mounting or manipulating tools, screw-driving tools or the like.

The media transmitted with the change-over coupling (1) may be of any desired type and may be identical or different from each other. Media may be, e.g., the fluidic compounds to be applied by the tool (3). The media may also be rigid or flexible functional bodies, e.g., screws, rivets, studs, sleeves, plugs or the like.

The media may also be operating materials for the tool (3). These may be, e.g., fluids, especially liquids or gases for cooling or lubricating or for actuating tool functions. Such media, may be, e.g., compressed air or hydraulic fluid, but also water under high pressure for water jet cutting, etc. Electric currents or voltages may likewise be a medium. Power currents and/or signal currents may be transmitted here. These are, e.g., welding currents and control or status signals or the like.

Rays or waves, especially light rays, may also be a medium. These may be, e.g., light pulses for optical signal transmission. Laser beams, plasma beams or the like can also be transmitted in the coupled position.

The direction of transmission of the media may be unidirectional or bidirectional. The media are fed via one or more rigid or flexible lines, which are connected to the media couplings (11, 12) on the robot side and the tool side.

The media couplings (11, 12) are adapted to the particular media to be transmitted and may have a modular design.

They may comprise each a media coupling support (13, 14) and a coupling element (29) fastened thereto. The preferably media-specific coupling elements (29) have each a connection for said line on the outside and one or more media-specific transmission elements (30), e.g., plugs or bushings, tubular holders or the like, on the inside, which are fitted together during coupling and again separated during uncoupling. The media couplings (11, 12) may possibly have automatic closing mechanisms for closing the lines, e.g., valves, covers or the like.

The media can be deflected at or within the change-over coupling (1). The transmission between the transmission elements (30) takes place in the plugging direction or along the axis (28). The direction of feeding and removal of the feed lines may differ herefrom. For example, the media may be deflected by 90°, and the direction of feed and/or removal is essentially in parallel to the principal plane of the coupling parts (4, 5) and may be oblique, especially tangential to the circumference of the coupling parts (4, 5).

Figure 2:
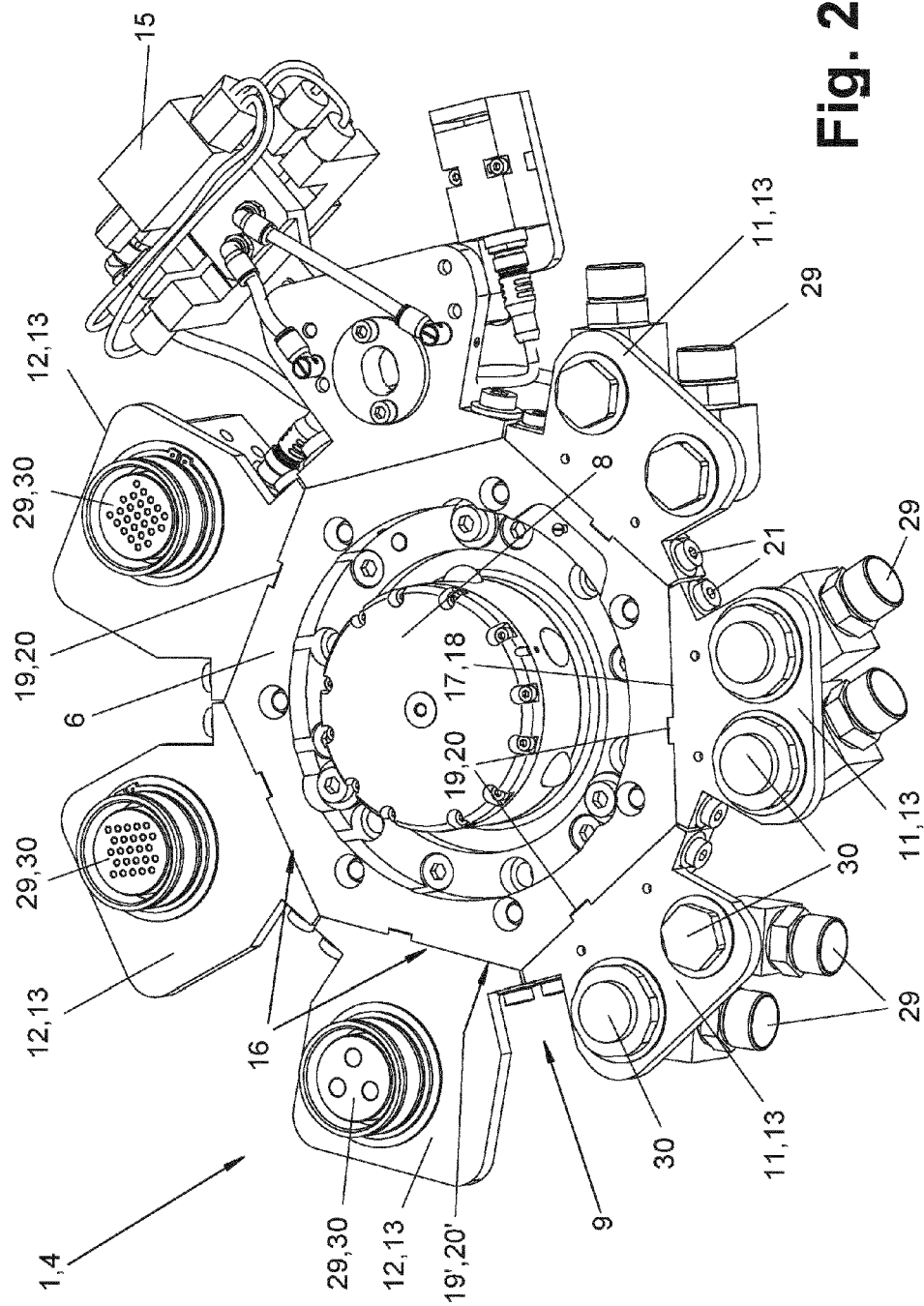
FIG. 2 is a perspective top view of the coupling side of a robot-side coupling part.
Figure 3:
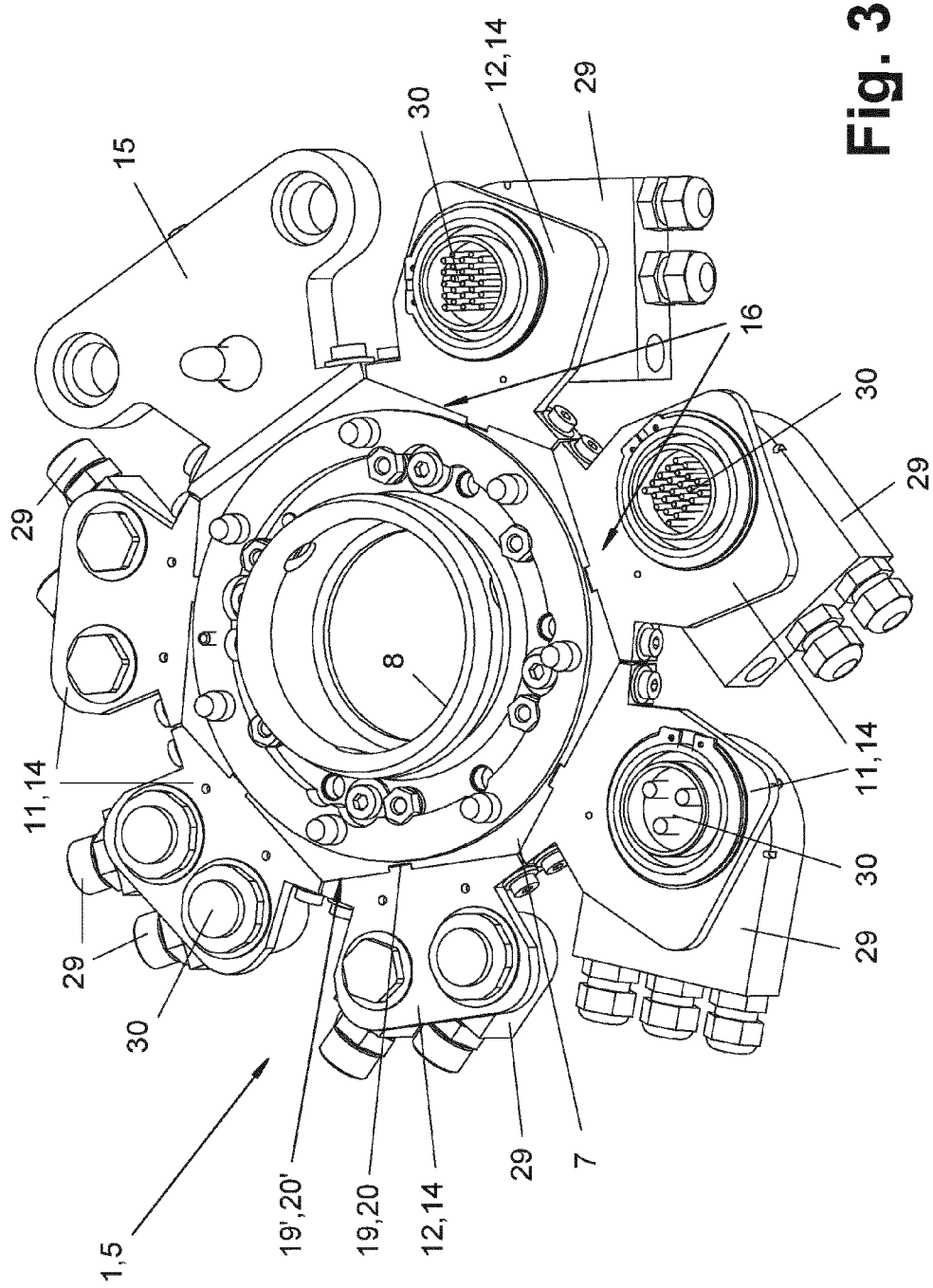
FIG. 3 is a perspective view of the coupling side of the tool-side coupling parts.

The media couplings (11, 12) are arranged in a ring around the axis (28), and the coupling elements (29) have, e.g., the oblique orientation shown in FIGS. 1, 2 and 3 for connecting the line and for the internal deflection of the media.

The interfaces (16) are arranged at the periphery at the basic supports (6, 7). They are located on the outer circumference or the jacket surface of the basic supports (6, 7), which have a round or prismatic shape for this, in the exemplary embodiments being shown. In case of a prismatic shape, the number of corners corresponds to the number of interfaces (16). As an alternative, the interfaces (16) may also be arranged in the area of the periphery of the basic bodies (6, 7) and on the surface thereof, which is oriented at right angles or obliquely to the axis (28).

The interfaces (16) have the same design among each other and cooperate with media coupling supports (13, 14) having a corresponding identical design. This makes it possible to place the media couplings (11, 12) as desired. All interfaces or only some of the interfaces (11, 12) may be occupied here. Such a standard interface (16) may also be used to attach the coupling supply (15), which is correspondingly adapted herefor with its attached parts. As an alternative, a special and adapted interface, which differs from the other interfaces (16), may be present for the coupling supply (15). Besides the media couplings (11, 12), other desired parts, which may have to be coupled, may also be attached to the standard interfaces (16).

Figure 5:
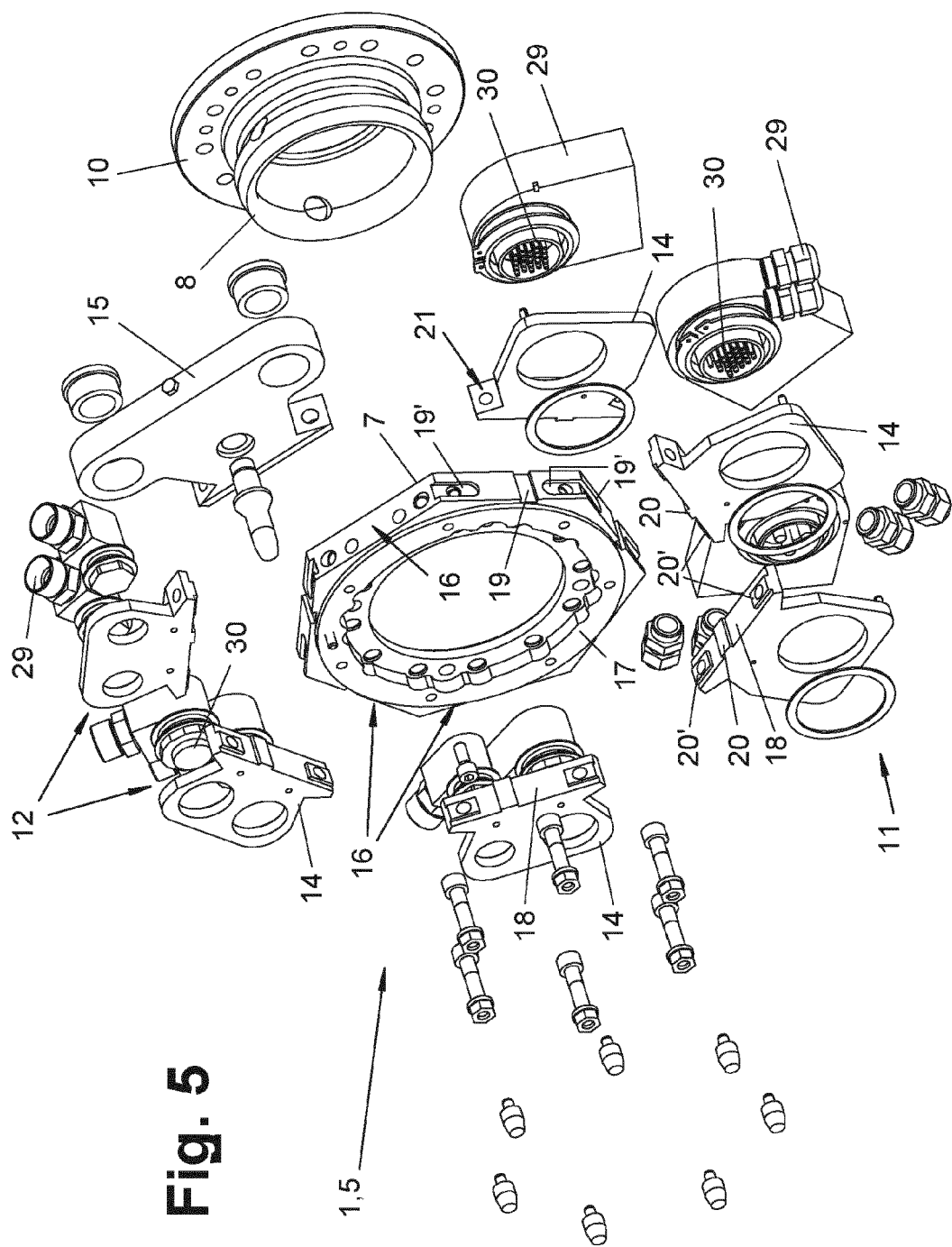
FIG. 5 is an exploded view of the parts of a tool-side coupling part and of the interfaces thereof.
Figure 6:
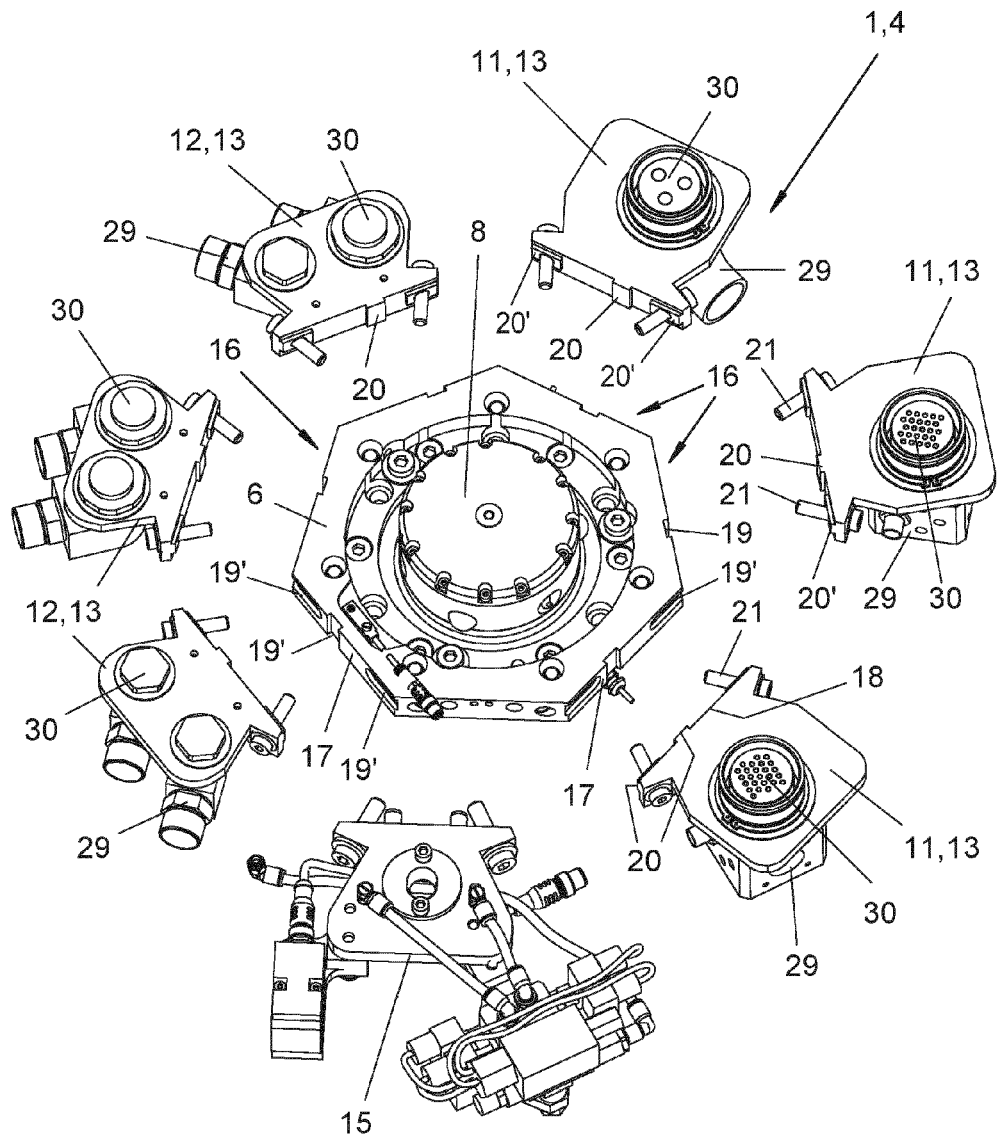
FIG. 6 is a perspective view of a robot-side coupling part with interfaces, media couplings and coupling supply in the released position.
Figure 7:
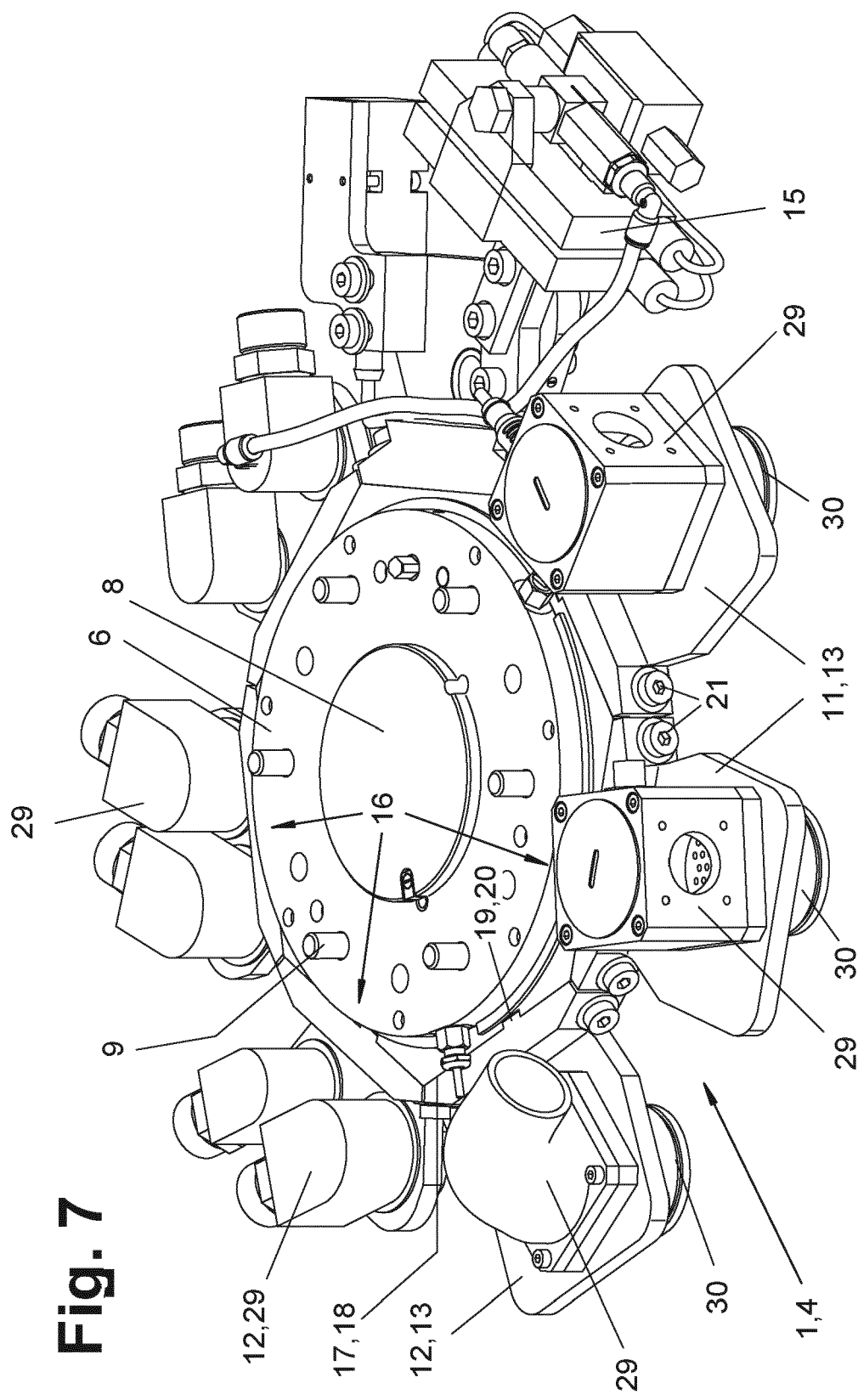
FIG. 7 is a perspective view of the outside and connection side of a robot-side coupling part.

The design of the preferably standard interfaces (16) is shown, e.g., in FIGS. 5 and 6. The interfaces (16) have fitting elements (19, 19', 20, 20') and a fixing means. They have, furthermore, flat or bent attachment surfaces (17, 18) with such fitting elements (19, 19', 20, 20'). The fitting elements (19, 20, 19', 20') preferably act in a plurality of different directions or axes.

In the exemplary embodiments of prismatic basic bodies (6, 7) shown, these have flat attachment surfaces (17) on the circumference, which carry one or more fitting elements (19, 19'), which are designed, e.g., as grooves in the attachment surface (17) here. The grooves (19, 19') may have different orientations, and the number of grooves is freely selectable as desired. The grooves (19, 19') may be oriented at right angles or obliquely in relation to one another. They have, e.g., an elongated, preferably rectangular shape with parallel longitudinal edges.

There is a central groove (19), which is directed in parallel to axis (28), in the exemplary embodiment being shown. Grooves (19'), which extend at right angles to axis (28) and along the attachment surface (17) and end at the edge of the surface and may be open there, are provided at the edges of the attachment surfaces (17).

Attachment surfaces (18) fitting the media coupling support (13, 14) and carrying opposite fitting elements (20, 20'), which are designed, e.g., as projecting wedges, which mesh with the corresponding grooves (19, 19') in the attached position in a positive-locking manner, are present at the media coupling supports (13, 14). The attachment surfaces (18) have, e.g., a central, projecting fitting element (20) oriented along axis (28) and two peripheral, projecting fitting elements (20') extending along the attachment surface (18). The opposite fitting elements (20, 20') likewise have a rectangular elongated shape with parallel longitudinal edges.

An exactly determined mutual position of the attachment surfaces (17, 18) and of the basic supports (13, 14), which mutual position is predetermined by positive locking, can be achieved due to the multiple number and different orientations of the fitting elements (19, 20, 19', 20'). This attached position is secured by the fixing means (21), which may comprise, e.g., screws. The screws may extend, e.g., through the peripheral fitting elements (19', 20').

The media coupling supports (13, 14) may have the plate-like shape shown in the exemplary embodiments with flanges for the attachment surface (18) and openings for the attachment and passage of the coupling elements (29). They may be identical to one another for the tool side and the robot side.

The basic supports (6, 7) have identical design concerning their interfaces (16) and have an exactly identical shape in this respect. The basic supports (6, 7) are aligned in the axial direction in the coupled position, and the media coupling supports (13, 14) attached via the interfaces (16) and the coupling elements (29) as well as transmission elements (30) are also exactly aligned with one another in the axial direction and mesh with one another in a coupling manner.

In a variant of the embodiment shown, the circumference or jacket of the basic supports (6, 7) may have a different shape, and the mutually fitted attachment surfaces (17, 18) and also the shape of the fitting elements (19, 19', 20, 20') as well as the fixing means (21) are also adapted correspondingly. The basic supports (6, 7) may have, e.g., a round shape, and said interface parts (17, 18, 19, 19', 20, 20') have a correspondingly bent shape.

Such an interface design, with attachment surfaces (17, 18), fitting elements (19, 19', 20, 20') and fixing means (21), is of independent inventive significance and can also be used for other change-over couplings (1), e.g., for conventional coupling constructions. The design of the interface may also be used, especially with corresponding adaptation, in an attachment situation in which attachment is performed on a surface of the basic bodies (6, 7) extending at right angles or obliquely to the central axis (28).

Figure 4:
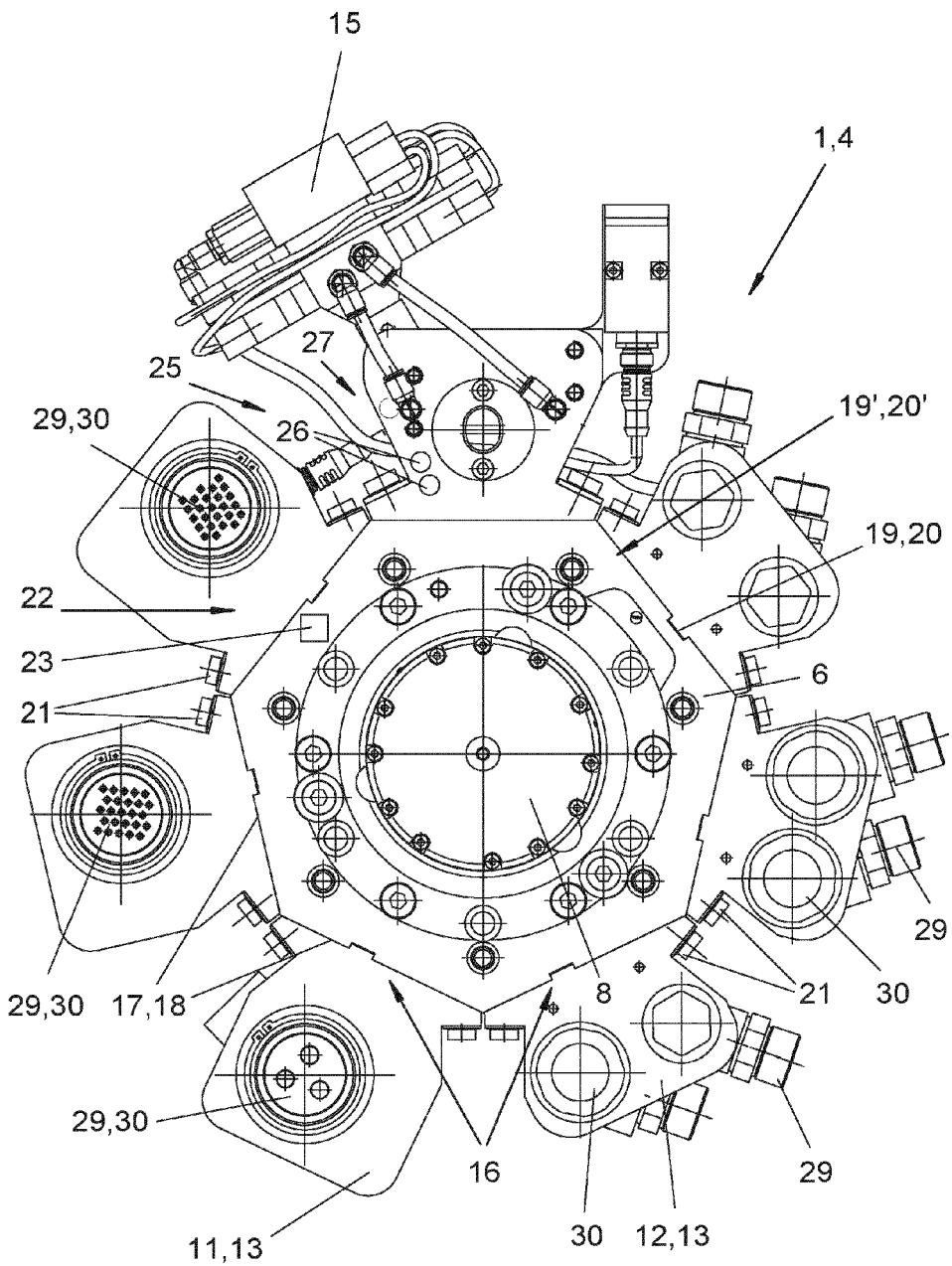
FIG. 4 is a top view of the inner side of the coupling side of a robot-side coupling part.

FIG. 4 illustrates further peculiar features of the change-over coupling (1) according to the present invention, especially a detection means (22) and a maintenance display (25), which are each of independent inventive significance and which may be optionally present or omitted. They may also be used in other, conventional change-over couplings (1) without standard interfaces (16) and in case of any desired attachment of media couplings to any desired basic supports and in case of the use of other coupling mechanisms (8). Fitting elements (19, 19', 20, 20') of the above-described type may be omitted in such conventional change-over couplings or different fitting elements may be present, especially in a different number, orientation and/or design.

FIG. 4 shows a detection means (22) for the mutual position of the coupling parts (4, 5). The detection means (22) is arranged, e.g., on the insides of the coupling parts (4, 5), which sides face each other for coupling, and may have different designs. The mutual position of the coupling parts (4, 5), which is present for coupling, can be determined with the detection means (22). This position may be the mutual position and may possibly also pertain to the mutual orientation of the coupling parts (4, 5). Differences in position may be present in all three space axes and may also be present in positions displaced in space and even in different rotated or tilted positions. Whether the coupling parts (4, 5) fit each other exactly in their position relative to axis (28) and whether they can be caused to exactly mesh with one another and coupled by a linear motion along axis (28) can be detected with the detection means (22). Detection means (22) can also detect, evaluate and signal position deviations.

A warning signal can be sent during signalization to the outside to a human operator or in another manner. Furthermore, an existing position deviation can be signaled in respect to its type and extent. A report may otherwise be sent directly to the robot control (not shown), which performs a compensating motion of the robot in case of existing position deviations and thereby establishes the correct coupled position. The detected position error can be stored and analyzed for quality assurance. Furthermore, the corrected coupled position of the robot can likewise be stored and used for later similar coupling operations.

The detection of the mutual positions of the coupling parts (4, 5) may be performed once during set-up. For example, tool (3) is now in a permanently preset mounting position at a tool holder, e.g., at a tool magazine (not shown). Robot (2) is moved into the intended coupling readiness position, which was possibly stored before in its continuous path control, in relation to the tool (3) kept ready. The mutual positions of the coupling parts (4, 5) are detected with the detection means (22) in this, still distanced readiness position, and the position and orientation of the robot (2) are correspondingly corrected in case of deviations and the corrected value is stored.

The stored value can be used during the subsequent operation for automatically approaching the tool holder for releasing and picking up the tool (3) without further testing procedures. However, detection means (22) may also be used again in these change-over operations with coupling and uncoupling in order to detect the position of the coupling parts (4, 5) prior to coupling. Possible external effects, e.g., changes in the robot position and/or tool position, can be detected now and corrected, if necessary.

In the exemplary embodiment being shown, the detection means (22) has a sensor (23) at a coupling part, preferably the robot-side coupling part (4), and an indicator (24) at the other coupling part (5).

Sensor (23) operates, e.g., optically. It may be designed for this purpose, e.g., as a laser scanner, which emits a laser beam and detects the reflection of the beam from the indicator (24). The laser beam can be moved in one or more axes and it can reach different sites of the other coupling part (5). Indicator (24) may be designed, e.g., as a shape pattern. This may be a two-dimensional or three-dimensional shape. A shape pattern may be formed, e.g., from strips with preset shapes and possible distances, which are optically detected by sensor (23) and analyzed in their detected position reference. A mutual three-dimensional position of the sensor (23) and of the indicator (24) as well as of the coupling parts (4, 5) connected thereto can be inferred from the detected position relations of the shape features.

FIG. 4 also illustrates the maintenance display (25) of the change-over coupling (1), which is also an independent inventive feature. This may be arranged at any desired and suitable site and may be located at any suitable site and may be located at one or both coupling parts (4, 5). The maintenance display (25) is arranged, e.g., at the coupling supply (15).

Maintenance display (25) has a display element (26) for signaling an operating situation and possibly a need for maintenance. The operating situation is characterized, e.g., by the number of coupling cycles. If a plurality of tools (3) exist, the number of couplings may be greater for the robot-side coupling part (4) than for the tool-side coupling parts (5), and the operating situation and the maintenance situation can therefore be detected separately. Display element (26) may emit one or more pieces of information. These may be different pieces of information. The emission may occur in a different manner. On the one hand, it is possible, e.g., to count the number of cycles, and the number is signaled directly in a suitable manner as a value or as a range, or a warning signal is signaled, e.g., optically with a colored LED, if a preset limit is reached.

In addition, time elements may be included in the detection. A tool (3) that had been removed and not used over a rather long time and its coupling part (4) may require maintenance solely due to the idle time. This information can be determined as an alternative or in addition to the number of cycles and signals by the display element (26) in a suitable manner.

Maintenance display (25) may have a determination means (27) for a maintenance need of the change-over coupling (1) or of the corresponding coupling part (4, 5). The determination means (27), which is schematically indicated in FIG. 4, may have, e.g., a memory and optionally a computer or control hardware of its own, especially a processor, and a time function element. Arrangement at the coupling supply (15), whose switching cycles and hence the coupling cycles can be determined directly, is favorable in this connection. Maintenance display (25) may have, besides, a power supply of its own and a power storage unit, especially a battery. The number of coupling cycles, possibly idle times and other factors, which affect the operating state and the maintenance requirement of the change-over coupling (1) and of the coupling parts (4, 5) thereof, can be determined with this autarchic maintenance display (25). As was stated, this determination can be performed separately for the coupling parts (4, 5). It may also be performed for the robot-side coupling part (4) only, in which case the maintenance of that coupling part may automatically entail maintenance of the tool-side coupling parts (4).

The coupling supply (15) is used in the manner mentioned in the introduction for actuating and controlling the coupling mechanism (8). This may happen, e.g., pneumatically, in which case the coupling supply (15) is connected to a compressed air feed source and controls the pneumatic actuation of the coupling mechanism (8) by means of valves. The coupling mechanism (8) may be redundant due to, e.g., two or more valve arrangements connected in parallel being present, so that another valve arrangement will automatically begin to function in case of failure of a valve arrangement. Corresponding detection means may be present herefor for the valve function.

The design is preferably diversitarily redundant. Different valve arrangements are used here, which may originate from the same manufacturer or from different manufacturers. The differences may be in the construction and/or in the manufacturer. This mitigates the risk and effect of a possible serial defect of one valve manufacturer. In another variant, the power supply and actuation of the coupling mechanism (8) may be brought about in another manner, in which case the coupling supply (15) has a correspondingly different design. For example, a hydraulic or electromagnetic actuation of the coupling mechanism (8) may be provided.

Various variants of the embodiments shown and described are possible. In the preferred embodiment being shown, the change-over coupling (1) contains all the components described with standard interfaces (16) in the arrangement and design mentioned with fitting elements (19, 19', 20, 20'), and the detection means (22) and the determination means (27) are also provided and the media couplings (11, 12) have the design described. The above-mentioned features and groups of features may, however, also be used individually and independently from one another in a change-over coupling (1). For example, the determination and detection means (22, 27) may be omitted here or used only individually. Conversely, the detection means (22) and/or the determination means (27) may also be used in other change-over couplings (1) that have any desired design and have, e.g., permanently attached and non-variable media couplings, and defined interfaces (16) that are all of the same type among each other may possibly also be eliminated. The detection means (22) and/or the determination means (27) may possibly also be used to retrofit existing change-over couplings. Furthermore, the features of the exemplary embodiments shown may be combined and transposed with one another as desired. Furthermore, design variations of the change-over coupling (1) and the components thereof are possible.

While specific embodiments of the invention have been shown and described in detail to illustrate the application of the principles of the invention, it will be understood that the invention may be embodied otherwise without departing from such principles.

The invention claimed is:

1. A change-over coupling for robot-guided tools, the change-over coupling comprising:
   one or more media couplings, each comprising a media coupling support;
   coupling parts comprising basic supports and a coupling mechanism with a change over coupling axis, as well as a plurality of interfaces at a periphery of the basic supports, wherein the interfaces each comprise:
   a flat or bent attachment surface with a plurality of fitting elements, for the media couplings, which act in a plurality of different directions or axes, the plurality of fitting elements comprise a central fitting element disposed centrally relative to the attachment surface and a peripheral fitting element disposed peripherally relative to the attachment surface, wherein one of the central fitting element and the peripheral fitting element extends in a direction of the change over coupling axis and the other of the central fitting element and the peripheral fitting element extends in another direction that is not the direction of the change over coupling axis; and
   a fixing means for fastening the media coupling support on a basic support at a respective one of the interfaces.

2. A change-over coupling in accordance with claim 1, wherein the interfaces are arranged at a periphery, on a circumference of a plate-like or annular basic support.

3. A change-over coupling in accordance with claim 1, wherein the interfaces have all the same configuration.

4. A change-over coupling in accordance with claim 1, wherein the fixing means has screws, at least a portion of each of said screws being located on a periphery of the fitting elements.

5. A change-over coupling in accordance with claim 1, wherein the fitting elements have parallel longitudinal edges.

6. A change-over coupling in accordance with claim 1, wherein the fitting elements have an elongated shape that extends in the direction of the change over coupling axis or in the other direction that is not the direction of the change over coupling axis.

7. A change-over coupling in accordance with claim 1, wherein the basic supports have a prismatic contour.

8. A change-over coupling in accordance with claim 1, wherein a mutual position of the attachment surface of each interface and a respective connected media coupling support is defined by the fitting elements in the direction of the change over coupling axis or in the other direction that is not the direction of the change over coupling axis that form a positive-locking connection.

9. A change-over coupling in accordance with claim 1, further comprising a coupling supply that can be attached to one of the interfaces.

10. A change-over coupling in accordance with claim 9, wherein the coupling supply comprises a power supply and a control means for the coupling mechanism.

11. A change-over coupling in accordance with claim 9, wherein the coupling supply comprises a redundant configuration.

12. A change-over coupling in accordance with claim 1, further comprising a detection means for detecting the mutual positions of the coupling parts.

13. A change-over coupling in accordance with claim 12, wherein the detection means comprises a sensor at one of the coupling parts.

14. A change-over coupling in accordance with claim 13, wherein the sensor comprises a laser scanner.

15. A change-over coupling in accordance with claim 12, wherein the detection means comprises an optical sensor.

16. A change-over coupling in accordance with claim 1, further comprising a maintenance display.

17. A change-over coupling in accordance with claim 16, wherein the maintenance display comprises a display element signaling an operating state and/or a maintenance need.

18. A change-over coupling in accordance with claim 16, wherein the maintenance display comprises a determination means for determining an operating state and/or for determining a maintenance need of the change-over coupling.

19. A change-over coupling in accordance with claim 18, wherein the determination means has a memory and a processor and a time function element.

20. A change-over coupling in accordance with claim 16, wherein:
   the maintenance display comprises a display element signaling an operating state and/or a maintenance need;
   the maintenance display further comprises a determination means for determining an operating state and/or for determining a maintenance need of the change-over coupling; and
   the determination means comprises a memory and a processor and a time function element.

21. A change-over coupling for robot-guided tools, the change-over coupling comprising:
   one or more media couplings, each of the media couplings comprising a media coupling support;

coupling parts comprising two basic supports and a coupling mechanism coupling the two basic supports, the two basic supports and the coupling mechanism having a change over coupling axis and further comprising a plurality of interfaces at a periphery of each of the two basic supports, wherein the interfaces each comprise:

a basic support flat or bent attachment surface;

a flat or bent media coupling support attachment surface at the media coupling support that corresponds to each flat or bent attachment surface at the two basic supports;

a plurality of basic support fitting elements comprising an elongate central fitting element disposed centrally on the basic support attachment surface and an elongate peripheral fitting element disposed peripherally on the basic support attachment surface, wherein one of the elongate central fitting element and the elongate peripheral fitting element extends in a direction of the change over coupling axis and the other of the elongate central fitting element and the elongate peripheral fitting element extends in another and different direction;

a plurality of media coupling support fitting elements comprising a cooperating elongate central fitting element disposed centrally on the media coupling support attachment surface and a cooperating elongate peripheral fitting element disposed peripherally on the media coupling support attachment surface the cooperating elongate central fitting element engaging the elongate central fitting element and the cooperating elongate peripheral fitting element engaging the elongate peripheral fitting element to fix a position of the media coupling support relative to the basic supports; and a fastener fastening one of the media coupling support on the basic supports in the position fixed by the fitting elements.

\* \* \* \* \*